US008047446B2

(12) United States Patent
Caillon

(10) Patent No.: US 8,047,446 B2

(45) Date of Patent: Nov. 1, 2011

(54) METHOD OF PROCESSING MAILPIECES THAT ENABLES VIRTUAL IDENTIFICATION OF THE MAILPIECES TO BE USED WITH FORWARDING

(75) Inventor: Christophe Caillon, Bretigny sur Orge (FR)

(73) Assignee: Solystic, Gentilly Cedex (FR)

( * ) Notice: Subject to any disclaimer, the term of this patent is extended or adjusted under 35 U.S.C. 154(b) by 378 days.

(21) Appl. No.: 12/295,775

(22) PCT Filed: Jun. 17, 2008

(86) PCT No.: PCT/FR2008/051076

§ 371 (c)(1),
(2), (4) Date: Oct. 2, 2008

(87) PCT Pub. No.: WO2009/007560

PCT Pub. Date: Jan. 15, 2009

(65) Prior Publication Data

US 2010/0163612 A1 Jul. 1, 2010

(30) Foreign Application Priority Data

Jun. 26, 2007 (FR) ..................................... 07 56025

(51) Int. Cl.
*G06K 19/06* (2006.01)

(52) U.S. Cl. ........................ 235/494; 235/375; 235/454

(58) Field of Classification Search .................... 235/462.01–462.49, 454, 494, 235/375
See application file for complete search history.

(56) References Cited

U.S. PATENT DOCUMENTS

| | | | | | |
|---|---|---|---|---|---|
| 5,422,821 | A * | 6/1995 | Allen et al. | .................. | 700/219 |
| 5,468,945 | A * | 11/1995 | Huggett et al. | .......... | 235/462.02 |
| 2002/0176111 | A1 | 11/2002 | Shaw et al. | | |
| 2004/0059462 | A1* | 3/2004 | Norris et al. | ................. | 700/223 |
| 2006/0184269 | A1 | 8/2006 | Wilson et al. | | |
| 2008/0093272 | A1* | 4/2008 | Kreitmeier et al. | ........... | 209/547 |
| 2010/0232642 | A1* | 9/2010 | Desprez | ....................... | 382/101 |

FOREIGN PATENT DOCUMENTS

| | | | |
|---|---|---|---|
| FR | 2 841 673 | A | 1/2004 |
| WO | WO 03/106057 | A | 12/2003 |
| WO | WO 2006/028791 | A | 3/2006 |

* cited by examiner

*Primary Examiner* — Thien M. Le
*Assistant Examiner* — Christle Marshall
(74) *Attorney, Agent, or Firm* — Rothwell, Figg, Ernst & Manbeck, P.C.

(57) ABSTRACT

In a method of processing mailpieces, a digital image of a surface of a current mailpiece is formed for the purpose of using OCR to recognize a recipient postal address for said current mailpiece, and, if it is determined that the recognized recipient address corresponds to an incorrect recipient address, a forwarding address is placed on said surface of the current mailpiece. In addition to said forwarding address, an OCR-detectable mark is placed on the surface of the current mailpiece, which mark indicates that the current mailpiece bears a forwarding address, and also constitutes an index for retrieving said forwarding address from a database.

6 Claims, 1 Drawing Sheet

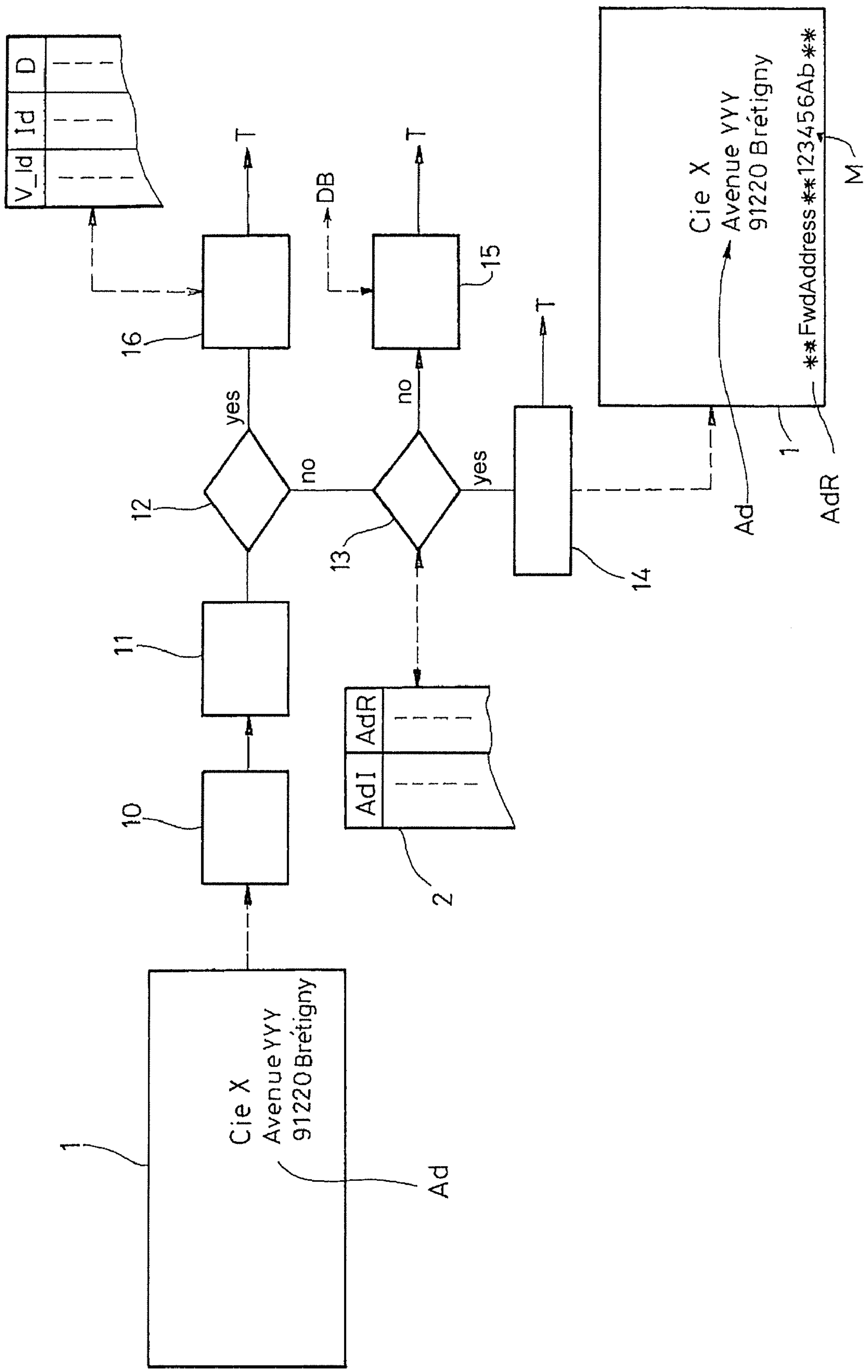
Cie X
Avenue YYY
91220 Brétigny
Ad
1
10
11
12
13
14
15
16
2
AdI
AdR
yes
no
T
DB
V_Id
Id
D
Cie X
Avenue YYY
91220 Brétigny
 FwdAddress 123456Ab **
M
AdR

METHOD OF PROCESSING MAILPIECES THAT ENABLES VIRTUAL IDENTIFICATION OF THE MAILPIECES TO BE USED WITH FORWARDING

CROSS-REFERENCE TO RELATED APPLICATIONS

This application is a 35 U.S.C. §371 National Phase Application from PCT/FR2008/051076, filed Jun. 17, 2008, and designating the United States, which claims the benefit of France Patent Application No. 0756025, filed Jun. 26, 2007.

BACKGROUND OF THE INVENTION

1. Field of the Invention

The invention relates to a method of processing mailpieces, in which a digital image of a surface of a current mailpiece is formed for the purpose of using Optical Character Recognition (OCR) to recognize a recipient postal address for said current mailpiece, and, if it is determined that the recognized recipient address corresponds to an incorrect recipient address, a forwarding address is placed on said surface of the current mailpiece.

2. Discussion of the Background Art

Such a method of processing mailpieces, with account being taken of mailpieces that are to be forwarded, is known, for example, from Patent Documents WO2005/049232, EP0949014, and EP0500180. Taking account of mailpieces that are to be forwarded can also be referred to as "readdressing". In a batch of mailpieces to be processed in a sorting machine, it is generally necessary to forward a fraction, of the order of a few percent, of the mailpieces. A mailpiece can need readdressing due to a change of address of the recipient of the mailpiece. The forwarding process is triggered for recipients that have asked the postal operator in charge of the inward sorting to forward their mail.

A conventional sorting process takes place as follows. A batch of mailpieces is put through a machine a first time, i.e. in a first sorting pass, for the purpose of using OCR to recognize the addresses of the recipients, and each mailpiece is directed to a sorting outlet of the machine. At the same time, each mailpiece is assigned a unique identification number that is placed on the surface of the mailpiece in the form of a barcode. During the second sorting pass, i.e. while each mailpiece is passing, for a second time, through the same sorting machine or through some other machine, said bar code is read back so as to retrieve the recipient address for the mailpiece in such a manner as to direct the mailpiece to the corresponding sorting outlet of the machine. If the mailpiece bears a recipient address that is incorrect, e.g. due to a change of address of the recipient about which the postal operator has been informed, then, during the first sorting pass, processing is applied that consists firstly in detecting, during the first sorting pass, that the recipient address recognized by OCR is an incorrect address (by scanning through a list of predetermined incorrect addresses kept by the postal operator and stored in the machine), and in placing a forwarding address (retrieved from the above-mentioned list of addresses or on the basis thereof) on the surface of the mailpiece (e.g. by printing it on a label). While this mailpiece to be forwarded is on its second sorting pass, the bar code is read back from the surface of the mailpiece so as to retrieve the identification number of the mailpiece, which number serves as an index for retrieving the forwarding address from a database so as to direct the mailpiece to the appropriate sorting outlet.

A technique is also known for virtually identifying the mailpieces that consists in deriving digital signatures from the images of the mailpieces, those signatures then serving as unique identifiers for the mailpieces. In that technique, while a mailpiece is undergoing a first sorting pass, and on the basis of the image of the surface of the mailpiece that bears the recipient postal address of the mailpiece, a digital signature (a kind of a graphical fingerprint) is derived that comprises a first component or "image component" representative of physical characteristics of the digital image of the mailpiece and a second component or "postal component" indicating at least the spatial position of the recipient address block present in the image of the mailpiece. These two components should not be correlated relative to each other. In particular, the image component is formed by "global" attributes that are representative of overall physical characteristics taken from the entire set of picture elements (pixels) of the digital image of the mailpiece. The image component is also formed of second attributes or "local" attributes that are representative of local physical characteristics taken from distinct portions of a grid applied over the image of the mailpiece (or of a plurality of different grids).

That digital signature is used as an index for retrieving OCR-recognized address information from a database. While the same mailpiece is undergoing a second sorting pass, an image of the surface of the mailpiece is formed again for the purpose of deriving a current signature that is compared with the candidate signatures recorded during the first sorting pass of the mailpieces. If it is detected that said current signature and a candidate signature match, i.e. coincide, it is then possible to retrieve said address information from said database so as to direct the mailpiece to the appropriate sorting outlet. That technology offers the advantage, in particular, of reducing the operating costs of a postal sorting machine by obviating the need for bar codes as descried in French Patent Document FR-2 841 673.

Unfortunately, in practice, that virtual mailpiece identification technique cannot be used directly in the presence of mailpieces to be forwarded because, between two sorting passes, the surfaces of such mailpieces to be forwarded must be modified by placing forwarding addresses that make it possible for the mailpieces to be delivered on a delivery round or "postman's walk".

SUMMARY OF THE INVENTION

An object of the invention is thus to propose a mailpiece processing method in which not only is account taken of mailpieces that are to be forwarded, but also virtual identification technology is used on the mailpieces.

To this end, the invention provides a method of processing mailpieces, which method comprises forming a digital image of a surface of a current mailpiece for the purpose of using OCR to recognize a recipient postal address for said current mailpiece, and, if it is determined that the recognized recipient address corresponds to an incorrect recipient address, said method further comprises placing a forwarding address on said surface of the current mailpiece, said method being characterized in that, in addition to placing said forwarding address on the surface of the current mailpiece, said method further comprises placing an OCR-detectable mark on said surface of the current mailpiece, which mark indicates that the current mailpiece bears a forwarding address, and also constitutes an index for retrieving said forwarding address from a database.

According to a feature of the method of the invention, said mark may be placed in the form of an OCR-recognizable symbol that is juxtaposed with an identification number that is also OCR-recognizable. This identification number may be placed in the form of a hexadecimal number. With the method of the invention, if said mark is not detected in the image of the current mailpiece, and if said recipient address recognized by OCR is not an incorrect recipient address, a digital signature is derived from the digital image of the current mailpiece, which digital signature constitutes an index for retrieving the recognized recipient address from said database.

BRIEF DESCRIPTION OF THE DRAWING

An implementation of the method of the invention is described in more detail below and is shown in the sole FIGURE in the form of a flow chart. This description is given merely by way of indicative example and does not limit the invention in any way.

DETAILED DESCRIPTION OF THE PREFERRED EMBODIMENTS

In the FIGURE, the various steps of the method of the invention are shown in highly simplified manner by a block diagram flow chart.

In addition, the FIGURE shows the surface of a mailpiece 1 bearing a recipient address block with a recipient address Ad that is incorrect due, for example, to a change of address. The FIGURE also shows the surface of the mailpiece 1 on which a forwarding address AdR has been placed, in this example at the foot of the mailpiece, under the recipient address block Ad.

As shown in the FIGURE, this forwarding address AdR is juxtaposed with a mark M that both indicates that said mailpiece is being forwarded, and also constitutes an index for retrieving said forwarding address from a database. In this example, the mark M is constituted by a number 123456Ab in alphanumeric characters, and, in this example, more precisely by a hexadecimal number (hexadecimal base 0123456789AbCdEF in which the characters "b" and "d" are used in place of the characters "B" and "D" for facilitating recognition by OCR), and by a predetermined symbol that is OCR-recognizable (the symbol "" in this example) that is disposed at each end of the hexadecimal number. The same symbol "" can also flank the forwarding address indicated by "FwdAddress" as shown in the FIGURE, thereby making it possible to facilitate recognizing the mark M by OCR.

With the method of the invention, when the mailpiece 1 is fed into the inlet of a postal sorting machine (not shown) for a first sorting pass, an image is formed in step 10 of the surface of the mailpiece that bears the recipient address block Ad, and OCR processing is applied for the purpose of automatically recognizing the recipient address. This OCR processing is also arranged for the purpose of searching, in step 11, for the presence in the image of a mark such as M that is recognizable by the presence of the symbol "**", for example.

If presence of the mark M is not detected in step 12, the process continues at step 13. If presence of the mark M is detected, the identification number Id of the mailpiece is extracted by OCR as described below.

In step 13, the recipient address recognized in step 11 is compared with the incorrect recipient addresses kept in a list of incorrect addresses 2. This list 2 is previously loaded into a memory of the sorting machine. This list 2 is shown in simplified manner with records each comprising two fields, an incorrect recipient address being stored in one of the fields (AdI), and a forwarding address associated with said incorrect address being stored in the other field (AdR).

If, in step 13, it is detected that the recipient address recognized by OCR is an incorrect address, a unique identification number is generated for the mailpiece in step 14, e.g. a 32-bit number, and the forwarding address AdR that corresponds to that address in the list 2 is placed on the surface of the mailpiece together with the mark M as indicated above with reference to the mailpiece 1. The mark M is thus constituted by the symbol "**" and by the unique 32-bit identification number encoded in hexadecimal code. In the FIGURE, the forwarding address AdR and the forwarding identification mark M are printed at the foot of the mailpiece. The exact position of this information can depend on the type of machine used. Depending on the characteristics of the sorting machine, it is also possible firstly to stick on a label for receiving the address AdR and the mark M.

If, in step 13, it is not detected that the recipient address recognized by OCR is an incorrect address in the list 2, then, in step 15, a digital signature is derived from the image of the mailpiece as indicated above. Then, a scan is made through a database BD in which candidate signatures V_Id are stored (these signatures are mailpiece signatures formed during a first sorting pass). If a match is detected with a candidate signature of the list, the address data D of the recipient that is recorded in correspondence with the matching signature V_Id is retrieved from the database DB so as to direct the mailpiece to the appropriate sorting outlet T. If a match with a candidate signature is not detected, this means that the mailpiece is on its first sorting pass, in which case the current signature V_Id is recorded in correspondence with the data D of the recipient address recognized by OCR in the database DB. This signature V_Id is assigned a unique identification number that serves as an index for retrieving the data D from the database DB.

If, in step 12, presence of the mark M is detected in the image of the mailpiece, and the identification number of the mailpiece is read by OCR, then, in step 16 the recipient address data D is retrieved by association from the database DB, and the mailpiece is directed to the appropriate sorting outlet T. The current signature of the mailpiece is also recorded in the database with the read identification number Id so that it can be used during the next sorting pass in the event that reading the identification number of the mark M fails at step 12 for the next sorting pass.

A mark such as M placed on the surface of the mailpiece in accordance with the method of the invention can also be used for processing Business Reply Mail (BRM), and in particular for keeping a record of the franking values of such reply mail.

Business reply mail is characterized by envelopes that are generally all identical and that are provided by issuer companies for potential customers during bulk mail shots so that interested users can return a reply, which is typically a form, an order, entry into a competition, etc., in the envelope provided. Business reply mail is recognizable by the presence of the symbol "T" in the stamp zone in France. Business reply mail is not franked, and the franking is invoiced by the postal operator (after postal delivery) to the company issuing the business reply mail, as a function of the recorded number of reply mailpieces actually delivered. For the purpose of performing this invoicing, the postal operator must therefore be able to count precisely the number of reply mailpieces for each issuer company but without counting the same reply mailpiece more than once during a plurality of sorting passes.

Processing business reply mail is very similar to processing mail with forwarding. While a mailpiece is on a first sorting pass, during the OCR address-recognition processing, a search is thus made for presence of a mark such as M in the image of the surface of the mailpiece so as to determine whether the mailpiece is of the BRM type. For business reply mail, it is possible to use an OCR-recognizable symbol that is different from the one used for mail that is being forwarded, e.g. the symbol "***".

If presence of said mark is not detected, the processing continues with a search for the symbol "T" representative of business reply mail. If presence of this symbol is detected, a unique identification number is generated for the mailpiece, and said number is placed on the mailpiece together with the mark indicating that it is a business reply mailpiece. If presence of the symbol "T" is not detected, the processing continues with generation of a digital signature that is associated with the mailpiece in an index database.

Conversely, if presence of the mark such as M is detected in the image of the mailpiece, which mark indicates that the mailpiece is a business reply mailpiece that has already undergone one sorting pass, the mailpiece identification number is read from the mark M and a message containing the number of the mailpiece, the recipient address read by OCR, and the time of passage through the sorting machine is transmitted to a central information system of the postal operator. This information enables the postal operator to count the number of reply mailpieces processed over a certain period of time for each BRM issuer company.

The invention claimed is:

1. A method of processing mailpieces in a sorting machine, comprising the steps of:

forming a digital image of a surface of a current mailpiece;

using OCR processing to recognize in said image a recipient postal address;

deriving from said image a digital signature for said current mailpiece, wherein said digital signature comprises a first component representative of physical characteristics of said image and a second component indicating at least a spatial position of said recognized recipient address in said image;

recording sorting data for said current mailpiece in correspondence with said digital signature in a database;

comparing said recognized recipient postal address with incorrect recipient addresses to detect if said recognized recipient postal address is an incorrect recipient address;

searching by using said OCR-processing if a predefined OCR-detectable forwarding identification symbol is present in said image, said symbol indicating that said current mailpiece bears a forwarding address; and further comprising one of the steps of:

upon detection of the presence of said symbol in said image, recognizing in said image by using OCR-processing a mailpiece identification number juxtaposed to said symbol and using said recognized number as an index in said database for retrieving sorting data corresponding to said current mailpiece;

upon detection that said symbol is not present in said image and that said recognized recipient postal address is not an incorrect recipient address, deriving from said image a current digital signature for said current mailpiece and comparing said current signature to candidate digital signatures stored in said database for retrieving sorting data corresponding to said current mailpiece in said database; and upon detection that said symbol is not present in said image and that said recognized recipient postal address is an incorrect recipient address, generating a unique mailpiece identification number for said current mailpiece, placing a forwarding address on said surface of the current mailpiece, further placing on said surface of the current mailpiece a predefined OCR-detectable forwarding identification symbol number juxtaposed to said unique mailpiece identification number.

2. A method according to claim 1, wherein said digital signature constitutes an index for retrieving the recognized recipient address from said database.

3. A method according to claim 1, wherein said digital signature constitutes an index for retrieving information from a database, the method further comprising a step of searching in said image of the mailpiece for the presence of a mark indicating that the mailpiece is a mailpiece undergoing forwarding or a mailpiece of the Business Reply Mail type, said mark being formed by an OCR-recognizable symbol juxtaposed with a mailpiece identification number that is also OCR-recognizable.

4. A method according to claim 1, wherein said unique identification number is placed in the form of a hexadecimal number.

5. A method according to claim 1, wherein said forwarding identification symbol and said mailpiece number and said forwarding address are placed at the foot of the current mailpiece.

6. A method of processing mailpieces, said method comprising the steps of:

forming a digital image of a surface of a current mailpiece for the purpose of using OCR to recognize a recipient postal address for said current mailpiece;

if it is determined that said recognized recipient address corresponds to an incorrect recipient address, placing a forwarding address on said surface of the current mailpiece; and in addition to placing said forwarding address on the surface of the current mailpiece, placing a an OCR-detectable mark on said surface of the current mailpiece, which mark indicates that the current mailpiece bears a forwarding address, and also constitutes an index for retrieving said forwarding address from a database, wherein said mark is placed in the form of an OCR-recognizable symbol that is juxtaposed with an identification number that is also OCR-recognizable, and the identification number is placed in the form of a hexadecimal number.

* * * * *